UNITED STATES PATENT OFFICE.

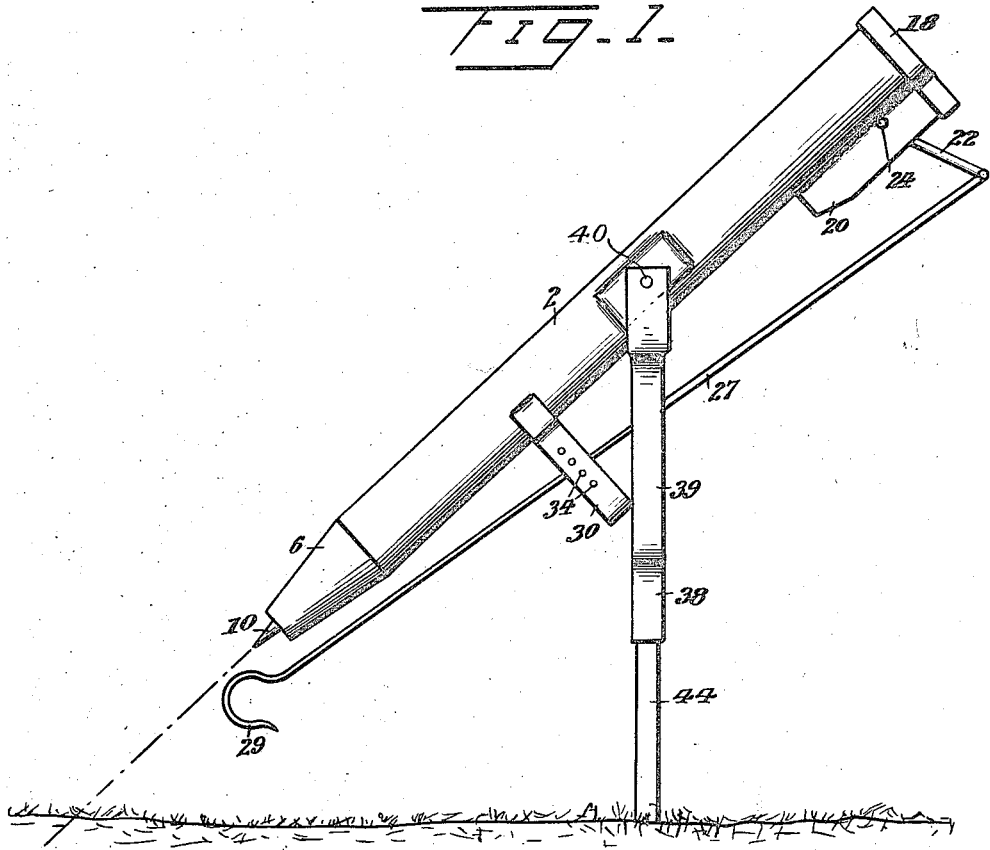
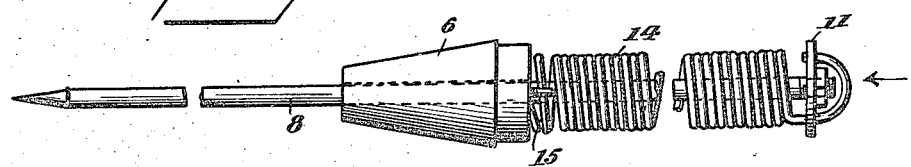
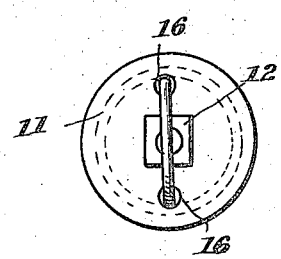

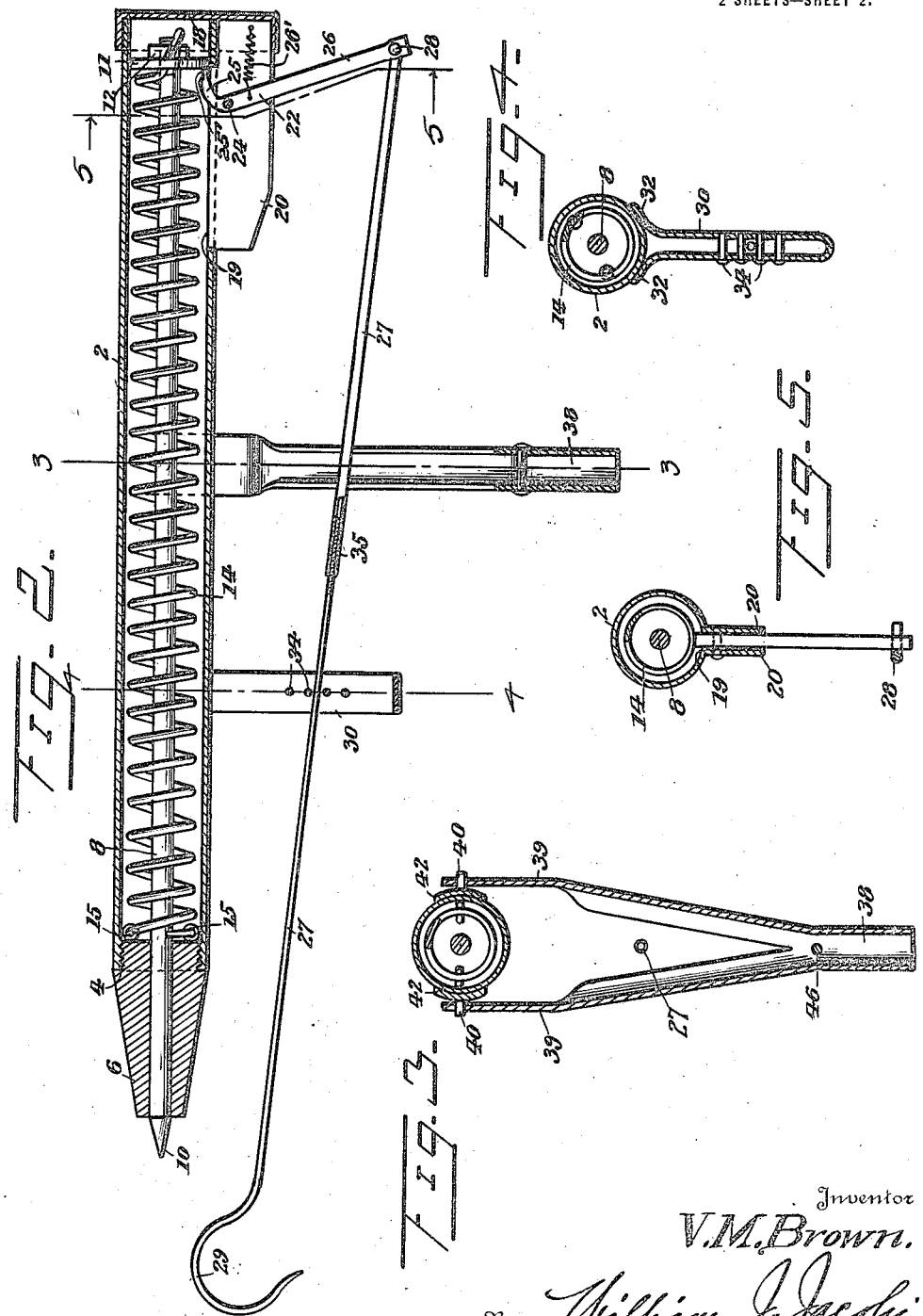

VERNON M. BROWN, OF ANTHONY, KANSAS.

TRAPPER'S SPRING GUN.

1,424,614. Specification of Letters Patent. Patented Aug. 1, 1922.

Application filed January 11, 1922. Serial No. 528,420.

*To all whom it may concern:*

Be it known that VERNON M. BROWN, a citizen of the United States, residing at Anthony, in the county of Harper and State of Kansas, has invented certain new and useful Improvements in Trappers' Spring Guns, of which the following is a specification.

This invention relates to animal traps and particularly to trappers' spring operated guns designed for the purpose of effectively and humanely killing animals, particularly of the fur variety.

One of the features of my invention is the provision of a spring operated gun, simple in construction, which may be conveniently set in the ground where needed, and in which the bait carrier is arranged in such a position with relation to the striking plunger that the latter when released and projected will engage or penetrate the head or body of the animal grasping and pulling the bait.

Another feature consists in mounting the gun in a manner that it automatically aims itself at the animal when the latter pulls on the bait, so that when the plunger is projected it will be sure to strike the animal as the bait is attempted to be dragged away.

Another feature resides in a construction which permits the bait carrier to be adjusted in its position laterally with relation to the path of movement of the plunger and also in the direction of its length, to the end that more accuracy of positioning of the bait may be obtained, resulting in greater surety of trapping or killing the animal.

A further feature resides in so mounting the gun that it may swing the bait in horizontal and vertical planes so that the plunger is discharged in the direction of the animal in whichever direction the bait is pulled.

In the accompanying drawings, which illustrate a preferred embodiment of my invention:—

Figure 1 is a side elevation of my gun, illustrating the manner of setting it in the ground or other support and in a position to discharge its plunger at an animal, or in other words its normal aiming position;

Figure 2 is a horizontal sectional view of the gun showing the plunger in retracted or set position, Figure 3 is a vertical sectional view on the line 3—3 of Fig. 2, Figure 4 is a vertical sectional view on the line 4—4 of Fig. 2, Figure 5 is a vertical sectional view on the line 5—5 of Fig. 2.

Figure 6 is a side elevation of the plunger, guide, and plunger projecting spring, the plunger having been released, and Figure 7 is a rear view of the device as shown in Fig. 6, looking in the direction of the arrow.

The gun proper embodies a tubular metal barrel 2 which is internally screw-threaded at one end as at 4, for the purpose of receiving the threaded end of a combined plug and guide 6, said plug having a central longitudinal guide passage or opening for the guidance of the plunger 8.

The plunger 8 comprises a rod, preferably circular in cross-section, the end which is adapted to strike or penetrate the animal being pointed as at 10, and projecting slightly beyond the end of the plug 6 when in retracted position.

At its inner end the rod or plunger is threaded and receives a disk 11 which is substantially of the shape and interior cross-section of the barrel so that it closely fits the interior thereof and functions in one respect as a centering means for this end of the plunger. The disk is secured against displacement by a nut 12.

Surrounding the plunger 8 is a coiled tension spring 14 secured at its ends, respectively by eyes 15 to the inner face of the plug 6 and to the disk 11, at which latter point, it is threaded through perforations 16. The rear end of the barrel is closed by a cap 18 which is screwed in place by any suitable means, said cap being designed to exclude dirt or moisture, although being removable when necessary to permit access to the interior parts for repair or replacement.

Adjacent its rear end, the barrel is provided with a longitudinal slot 19, from the walls of which depend parallel wings or flanges 20, between which swings a trigger 22 pivoted by means of a pin 24 supported at its ends in said wings. The upper end of the trigger is provided with an inclined shoulder 25 adapted to engage behind the disk 11 and maintain the plunger 8 in retracted position against the tension of the spring until released by a forward thrust on the lever 26 of the trigger which thereby clears the shoulder from the path of movement of said disk, said upper end of the trigger being further provided with an integral stop 25' which cooperates with the under face of the barrel to limit the movement of said trigger in one direction. A coil spring 26' connected at its ends with said flanges 20 and said lever 26 below its pivot 24 serves to maintain the trigger in latched position.

For the purpose of operating the trigger, to release the plunger, I provide a bait carrier which comprises a rod 27 extending longitudinally of the gun and pivoted at its rear end at 28 to the outer end of the trigger lever, and at its forward end being formed with a bait securing hook 29. For the purpose of supporting the hook 29 in a position where it may be adjusted laterally with respect to the path of travel of the pointed end of the plunger, I provide a hanger 30 comprising a U-shaped metal strap suitably secured at 32 to the wall of the barrel intermediate its ends, said hanger being provided with a vertical series of transverse pins 34, upon any one of which the rod 27 may rest.

Intermediate its ends, the rod is separable, being joined by screw and socket connection 35, permitting of the rod not only to be adjusted in the direction of its length to properly position the bait carried on the hook, but also to be separated so that it may be placed on any one of the pins 34.

For the purpose of supporting the gun so that it may be permitted to adjust itself so that the plunger is directed or aimed at the animal grasping and pulling on the bait, I provide a supporting standard having a cylindrical socket 38 at its lower end, and formed at its upper end with a yoke or bifurcated portion, the arms 39 of which extend on opposite sides of the barrel and receive diametrically opposite pivot or journal pins 40 carried by plates 42 fixed to the sides of said barrel. By this arrangement the gun is trunnioned on its support, and on which it may freely tilt or swing in a vertical plane.

To the end that the gun may also be permitted to swing in a horizontal plane, I provide a stake 44 which is driven in the ground where the gun is to be used, the upper end of the stake being cylindrical in cross-section and being received within the socket 38 of the supporting standard. Thus, the entire gun may be adjusted in both horizontal and vertical planes, to accommodate itself to the proper aiming position. A transverse pin 46 limits the extent of movement of the stake into the socket.

It is believed that the construction and operation of my gun will be clear to those skilled in the art to which the invention relates.

What I claim as new and desire to protect by Letters Patent is:—

A spring gun comprising a barrel, a spring projected plunger therein, a trigger releasing said plunger whereby it may be projected beyond one end of said barrel, a bait carrier comprising a rod connected at its rear end with said trigger and at its forward end provided with a bait receiving hook disposed beyond the end of the gun, a hanger depending from said barrel and provided with a vertical series of horizontal pins, said bait carrier rod extending through said hanger and resting on one of said pins, and means for longitudinally adjusting said rod.

In testimony whereof I affix my signature.

VERNON M. BROWN.